US007558214B2

(12) United States Patent
Previdi et al.

(10) Patent No.: US 7,558,214 B2
(45) Date of Patent: Jul. 7, 2009

(54) MECHANISM TO IMPROVE CONCURRENCY IN EXECUTION OF ROUTING COMPUTATION AND ROUTING INFORMATION DISSEMINATION

(75) Inventors: Stefano B. Previdi, Rome (IT); Clarence Filsfils, Brussels (BE); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 10/928,866

(22) Filed: Aug. 27, 2004

(65) Prior Publication Data
US 2006/0045024 A1 Mar. 2, 2006

(51) Int. Cl.
*H04L 12/28* (2006.01)
(52) U.S. Cl. .................... 370/254; 370/255
(58) Field of Classification Search .......... None
See application file for complete search history.

(56) References Cited

U.S. PATENT DOCUMENTS

| 5,175,765 | A | * | 12/1992 | Perlman ............ 380/30 |
| 5,964,841 | A | | 10/1999 | Rekhter |
| 6,820,134 | B1 | | 11/2004 | Zinin et al. |
| 7,237,262 | B2 | * | 6/2007 | Lahti et al. ............ 726/13 |
| 2002/0093954 | A1 | * | 7/2002 | Weil et al. ............ 370/389 |
| 2002/0141345 | A1 | * | 10/2002 | Szviatovszki et al. ....... 370/238 |

OTHER PUBLICATIONS

Perlman, Radia, Interconnections Second Edition: Bridges, Routers, Switches, and Internetworking Protocols, Section 1.1: Layers, Addison Wesley, 1999, pp. 1-7.

Perlman, Radia, Interconnections Second Edition: Bridges, Routers, Switches, and Internetworking Protocols, Section 12.2.4: Computing Routes, Addison Wesley, 1999, pp. 317-319.

U.S. Appl. No. 10/868,721, filed Jun. 15, 2005, entitled Avoiding Micro-Loops Upon Failure of Fast Reroute Protected Links, by Vasseur et al.

Moy, J., RFC 2178, entitled OSPF Version 2, Network Working Group, Jul. 1997, pp. 1-197.

Callon, R., RFC 1195, entitled Use of OSI IS-IS for Routing in TCP/IP and Dual Environments, Network Working Group, Dec. 1990, pp. 1-80.

* cited by examiner

*Primary Examiner*—Hong Cho
*Assistant Examiner*—Anthony Sol
(74) *Attorney, Agent, or Firm*—Cesari and McKenna LLP

(57) ABSTRACT

A technique enables an intermediate network node to efficiently process link-state packets using a single running context (i.e., process or thread). The intermediate network node floods received link-state packets (LSP) before performing shortest path first (SPF) calculations and routing information base (RIB) updates. In addition, the node limits the number of LSPs that are permitted to be flooded before the node performs its SPF calculations. More specifically, if the number of link-state packets that are flooded during a flooding cycle exceeds a first predetermined threshold value, the node performs the SPF calculations before additional packets may be flooded. The intermediate network node also limits how long its RIB update may be delayed in favor of flooding operations. When the number of LSPs flooded after the SPF calculations exceeds a second predetermined threshold value or there are no more packets to be flooded, the node updates the contents of its RIB based on the SPF calculations.

24 Claims, 10 Drawing Sheets

| ADVERTISING NODE 510 | SEQUENCE NUMBER 520 | AGE 530 | FLAGS 540 | | | | LSP DATA 550 |
|---|---|---|---|---|---|---|---|
| | | | SEND FLAGS 542 | | ACK FLAGS 544 | | |
| | | | A | B | A | B | |
| A | 1122 | 47 | 0 | 1 | 1 | 0 | (NEIGHBOR, COST)$_1$ TO N$_1$ |
| B | 73 | 59 | 0 | 0 | 0 | 1 | (NEIGHBOR, COST)$_1$ TO N$_2$ |
| C | 512 | 60 | 1 | 1 | 0 | 0 | (NEIGHBOR, COST)$_1$ TO N$_3$ |

ROUTING INFORMATION BASE 700

| DESTINATION 710 | PORT 720 | OTHER ROUTING INFORMATION 730 |
|---|---|---|
| N | P4 | |
| A | P2 | |
| B | P2 | |
| H1 | P2 | |
| H2 | P2 | |
| H3 | P3 | |

705

MECHANISM TO IMPROVE CONCURRENCY IN EXECUTION OF ROUTING COMPUTATION AND ROUTING INFORMATION DISSEMINATION

FIELD OF THE INVENTION

This invention relates generally to network communications, and, more specifically, to an efficient technique for calculating and disseminating routing information by an intermediate network node, such as a router or switch.

BACKGROUND INFORMATION

A computer network is a geographically distributed collection of interconnected subnetworks for transporting data between network nodes, such as computers. A local area network (LAN) is an example of such a subnetwork. Since management of a large number of subnetworks can prove burdensome, the network may contain smaller groups of one or more subnetworks that may be managed as separate routing domains or autonomous systems (AS). The network topology is defined by an arrangement of client nodes that communicate with one another, typically through one or more intermediate network nodes, such as a router or switch. As used herein, a client node is an endstation node that is configured to originate or terminate network communications. In contrast, an intermediate network node is a node that facilitates routing data and messages among the client nodes. Communications between network nodes are typically effected by exchanging discrete packets of data according to predefined protocols. In this context, a protocol consists of a set of rules defining how the nodes interact with each other.

The data packets transferred among the network nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. A network interface contains the mechanical, electrical and signaling circuitry and logic used to couple a network node to one or more physical links; each physical link may be coupled to a corresponding port on the network interface. The network is interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the packet's logical path (or "virtual circuit") through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

In operation, a client node sends a data packet to a network interface of the intermediate network node. The intermediate network node determines how to process the packet, e.g., based on which network interface the packet is received. For example, the intermediate network node may perform a path switching function that simply re-directs the packet from one network interface to another. In this case, the packet may be transmitted over a network interface that has been previously associated with the packet's destination MAC address.

Alternatively, the intermediate network node may perform a path determination, or forwarding decision, function that selects the most appropriate network interface to forward the packet. Specifically, the intermediate network node may parse a destination IP address from the packet's internetwork header and perform an "address lookup" operation to locate routing information corresponding to the parsed address. Here, routing information is broadly understood to include any information, such as adjacency information, bridge-forwarding information, etc., that may be used to determine the packet's next hop, and, in some cases, provide other services such as quality-of-service, billing, and so forth.

The intermediate network node often stores its routing information in a routing information base (RIB). The RIB is a searchable data structure in which network addresses are mapped to their associated routing information. For purposes of discussion, it will be assumed that a RIB is configured as a routing table, and thus the terms "routing table" and "RIB" will be used interchangeably hereinafter. However, those skilled in the art will understand that the RIB need not be organized as a table, and alternatively may be another type of searchable data structure. Although the intermediate network node's RIB may be configured with a predetermined set of routing information, the node also may dynamically acquire ("learn") network routing information as it sends and receives data packets. When a packet is received at the intermediate network node, the packet's destination IP address may be used to identify a RIB entry containing routing information associated with the received packet. Among other things, the packet's routing information indicates the packet's next-hop address, so the packet's layer-2 (MAC) information can be appropriately modified and the packet transmitted to its next destination.

To ensure that its RIB contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its RIB to ensure that data packets are not routed to the unavailable network node. Furthermore, the intermediate node also may communicate this change in network topology to the other intermediate network nodes so they, too, can update their local RIBs and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol. Examples of conventional link-state protocols include, but are not limited to, the Open Shortest Path First (OSPF) protocol and the Intermediate-System-to-Intermediate-System (IS-IS) protocol. The OSPF protocol is described in more detail in Request for Comments (RFC) 2178, entitled *OSPF Version* 2, dated April 1998, which is incorporated herein by reference in its entirety. The IS-IS protocol is described in more detail in RFC 1195, entitled *Use of OSI IS-IS for Routing in TCP/IP and Dual Environments*, dated December 1990, which is incorporated herein by reference in its entirety.

Conventional link-state protocols use link-state packets (or "advertisements") for exchanging routing information between interconnected intermediate network nodes. As used herein, a link-state packet (LSP) generally describes any message used by a routing protocol for communicating routing information among interconnected intermediate network nodes, i.e., routers and switches. Operationally, a first intermediate network node may generate a LSP and "flood" (i.e., transmit) the packet over each of its network interfaces coupled to other intermediate network nodes. Thereafter, a second intermediate network node may receive the flooded LSP and update its RIB based on routing information contained in the received LSP. Next, the second intermediate node may flood the received LSP over each of its network interfaces, except for the interface at which the LSP was received. This flooding process may be repeated until each interconnected intermediate node has received the LSP and updated its local RIB.

In practice, each intermediate network node typically generates and disseminates a LSP whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, LSPs are usually flooded until each intermediate network node has received a LSP from each of the other interconnected intermediate nodes. Then, each of the intermediate nodes can construct the same "view" of the network topology by aggregating the received lists of neighboring nodes and cost values. To that end, each intermediate network node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each intermediate network node updates the routing information stored in its local RIB based on the results of its SPF calculation. More specifically, the RIB is updated to correlate destination nodes with network interfaces or ports associated with the lowest-cost paths to reach those nodes, as determined by the SPF calculation.

Intermediate network nodes often execute a single "running context," i.e., a process or thread, that is configured to perform the following ordered sequence of events: receive a LSP, perform a SPF calculation and RIB update based on the contents of the received LSP, then flood the received LSP. Because the SPF calculation and RIB update consume considerable amounts of processing time and resources in the intermediate network node, packet flooding is often delayed an unreasonable amount of time until these routing computations are completed.

As a result of these conventional flooding delays, routing information is not disseminated efficiently among the intermediate network nodes. For instance, due to delays in receiving updated network topology information, some of the intermediate nodes may continue to forward packets based on out-dated routing information. This, in turn, can lead to undesirable network effects such as "micro-loops," which are discussed in more detail in U.S. patent application Ser No. 10/868,721 to Vasseur et al., entitled *Avoiding Micro-Loops Upon Failure of Fast Reroute Protected Links*, which is hereby incorporated by reference as though fully set forth herein.

In addition, the conventional flooding delays also may create a backlog of LSPs waiting to be flooded in the intermediate network node. That is, while the computationally-intensive SPF and RIB computations are being performed, LSPs received at the intermediate node may continue to deplete the node's available buffer memory and/or receive and transmission queues until one or more of these memory resources becomes full. Consequently, newly-received data packets, such as LSPs, may become lost or "dropped" at the intermediate node due to the lack of available memory resources.

One prior solution for reducing conventional flooding delays utilizes separate processes or threads that respectively perform flooding operations and routing-table computations, i.e., SPF and RIB computations. However, this is not always practically feasible and requires major re-writing of applications. The idea outlined in this document is an optimization of flooding and SPF/RIB update computation processing performed within a single running context.

SUMMARY OF THE INVENTION

The present invention provides a technique for an intermediate network node, such as a router or switch, to efficiently process link-state packets using a single running context (i.e., process or thread). The technique optimizes the concurrency of flooding operations and routing-table computations that the node performs in accordance with link-state protocols. Unlike prior single-context implementations, the intermediate network node does not delay flooding until after the node's routing-table computations are completed. Instead, the node floods received link-state packets before performing shortest path first (SPF) calculations and routing information base (RIB) updates. Because a plurality of link-state packets may be flooded before routing-table computations are performed, the intermediate network node can perform a single set of SPF and RIB computations for the plurality of flooded packets, thereby reducing the number of computationally intensive routing-table computations conventionally performed.

In accordance with the present invention, the intermediate network node limits the number of link-state packets that can be flooded before the node performs SPF calculations. More specifically, if the number of link-state packets flooded during a "flooding cycle" exceeds a first predetermined threshold value, then the node stops its flooding operations and begins the SPF calculations. As used herein, a flooding cycle is a sequence of events performed by the intermediate network node as it floods one or more link-state packets. By imposing a limit on the number of flooded packets in this manner, the SPF calculations are not delayed an unreasonable amount of time as a result of excessive packet flooding.

In addition, the intermediate network node also limits how long its RIB update may be delayed in favor of flooding operations. Specifically, after the node performs SPF calculations, if the number of link-state packets that are subsequently flooded exceeds a second predetermined threshold value or there are no more packets to flood, then the intermediate network node updates the contents of its RIB based on the results of the SPF calculations. As such, the intermediate network node ensures that its routing table remains up-to-date, even in the presence of heavy amounts of link-state traffic requiring flooding operations.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an illustrative link-state database;

FIG. 7 is a schematic block diagram of an exemplary routing information base;

DETAILED DESCRIPTION OF ILLUSTRATIVE EMBODIMENTS

A. Intermediate Network Nodes

Figure 1:
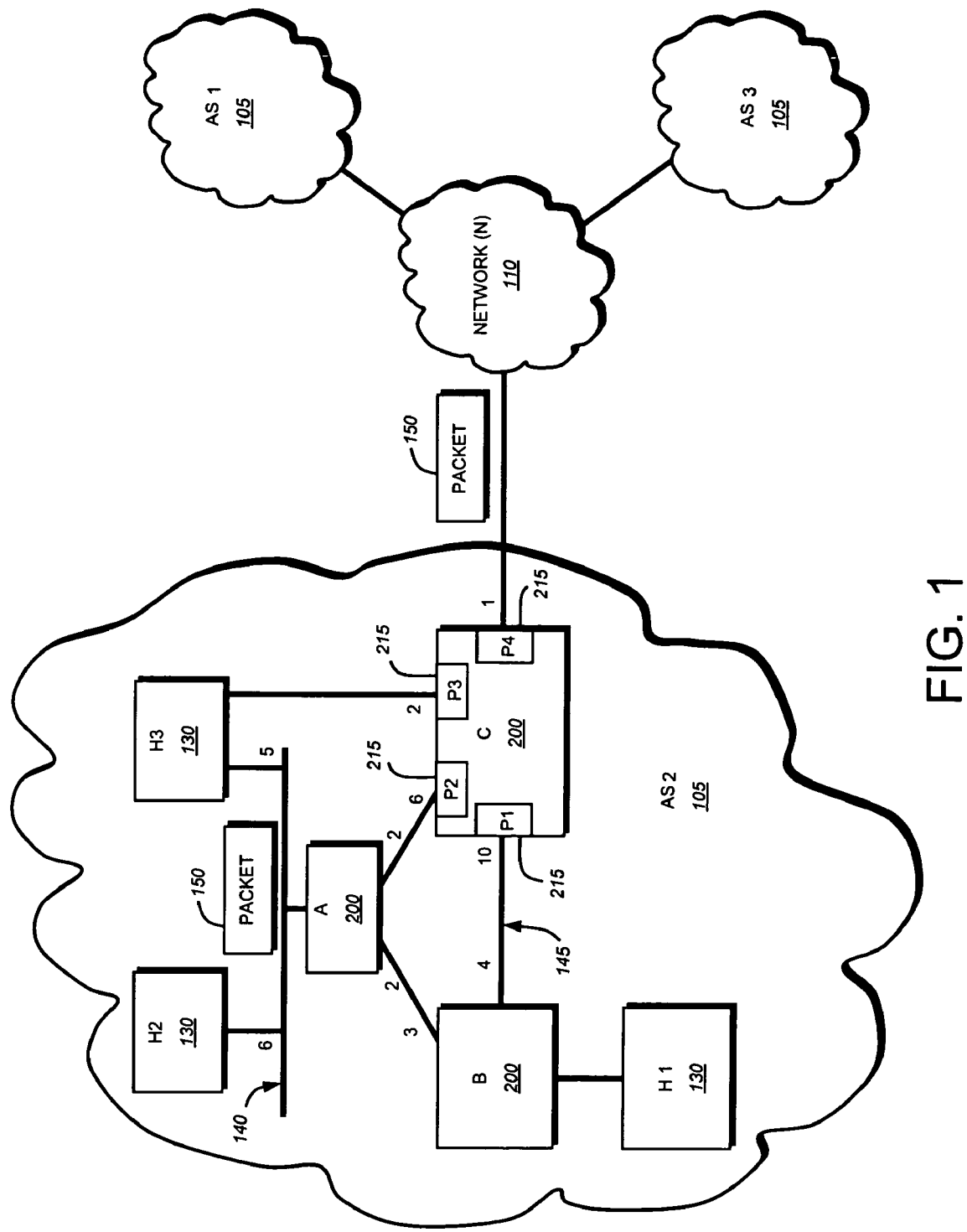
FIG. 1 is a schematic block diagram of a computer network comprising a plurality of autonomous systems interconnected by intermediate network nodes.

FIG. 1 is a schematic block diagram of an exemplary computer network 100 comprising a plurality of routing domains or autonomous systems 105 ($AS_1$-$AS_3$) interconnected by a network 110. Each autonomous system (AS) includes one or more network nodes, including client nodes 130 and intermediate network nodes 200. Typically, at least one intermediate node 200 is designated as a "gateway" node through which client communications can pass into and out of the AS 105. The gateway node may permit data packets 150 to be exchanged with other autonomous systems, i.e., through the network 110, using predefined network communication protocols such as the Transmission Control Protocol/Internet Protocol (TCP/IP), Asynchronous Transfer Mode (ATM) protocol, Frame Relay protocol, Internet Packet Exchange (IPX) protocol, etc.

Data packets 150 also may be communicated entirely within an autonomous system 105. For instance, the AS may include an intermediate network node 200 which is connected to at least one client node 130 by, e.g., a point-to-point link 145 or a local area network 140. Thus, the client nodes in the AS may exchange discrete data packets 150 with one another through the intermediate network node. Further, each intermediate network node 200 also may exchange data packets with other intermediate nodes in the AS. For instance, the intermediate nodes may exchange data packets containing network topology information (and/or other routing information) in accordance with a link-state protocol, such as the Open Shortest Path First (OSPF) protocol or Intermediate-System-to-Intermediate-System (IS-IS) protocol, or using other interior gateway protocols.

Figure 2:
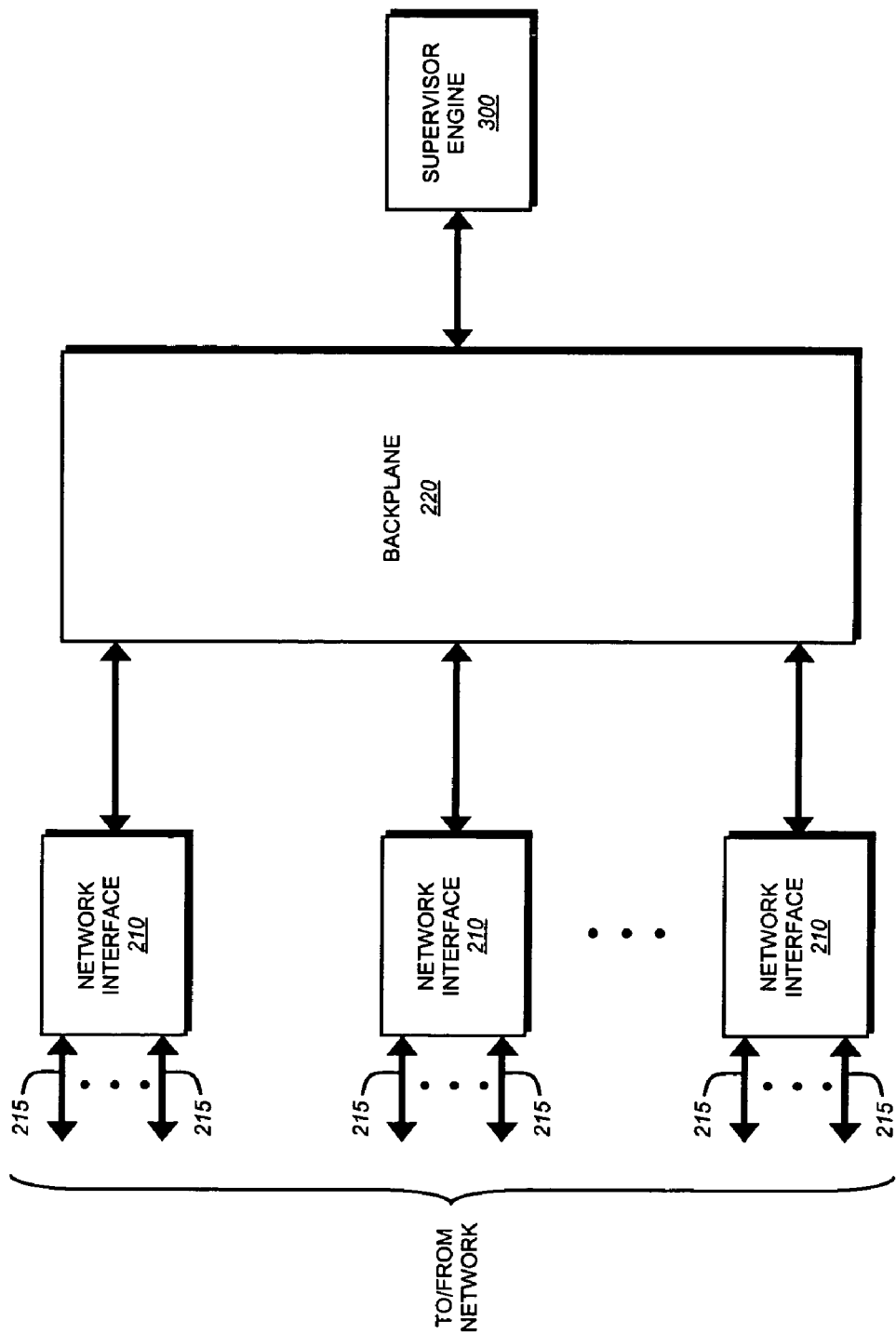
FIG. 2 is a schematic block diagram of an intermediate network node that may be advantageously used with the present invention.

FIG. 2 is a schematic block diagram of an intermediate network node 200, which is illustratively a router. Suitable intermediate network nodes that may be used with the present invention include the Cisco 7200, 7600, 10000 and 12000 Series routers available from Cisco Systems Incorporated, San Jose, Calif. The intermediate node 200 comprises one or more network interfaces 210 and a supervisor engine 300 interconnected by a backplane 220. The node 200 is configured to perform, inter alia, various layer-2 (data-link layer) and layer-3 (internetwork layer) switching and routing functions. The intermediate network node 200 provides support for various combinations of network protocols which may include link-state protocols, such as the OSPF and IS-IS protocols.

The backplane 220 comprises a point-to-point interconnect bus that interconnects the various network interfaces 210 and allows data and signals to be transferred from one interface to another. The network interfaces include the mechanical, electrical and signaling circuitry and logic used to couple the intermediate network node to other network nodes, such as client nodes 130 and intermediate nodes 200. Accordingly, each network interface 210 contains one or more ports 215 over which data packets 150 can be transferred and acquired. The ports may comprise, e.g., ATM, Ethernet, Fast Ethernet (FE), Gigabit Ethernet (GE), and Frame Relay ports.

The supervisor engine 300 includes circuitry and logic configured to manage switching and routing operations performed by the intermediate network node 200. To that end, the supervisor engine may include a processor configured to execute one or more running contexts, i.e., processes or threads. For instance, the engine 300 may execute a router operating system, such as the IOS™ operating system by Cisco Systems Incorporated, which employs one or more running contexts for processing link-state packets (LSP) as set forth in the present invention.

Figure 3:
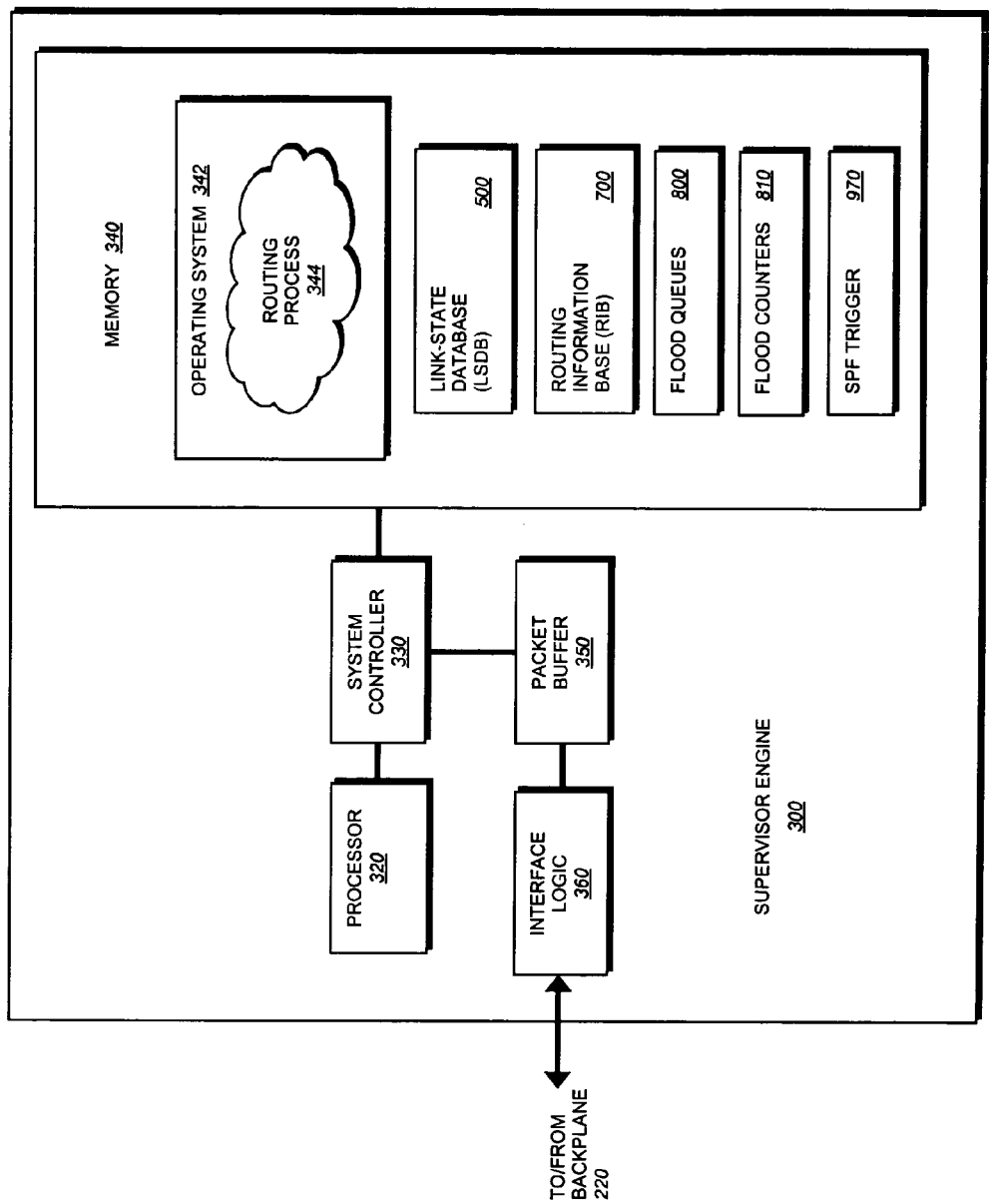
FIG. 3 is a schematic block diagram of a supervisor engine that may be used in accordance with the present invention.

FIG. 3 illustrates the supervisor engine 300 in more detail. The supervisor engine comprises a processor 320, a system controller 330, a memory 340, a packet buffer 350 and interface logic 360. Data received at the network interfaces 210 is forwarded through the backplane 220 to the interface logic 360. The interface logic, in turn, may format the received data so the data can be forwarded and stored at an appropriate location in the packet buffer 350. The packet buffer is generally a high-speed random access memory (RAM), such as a static RAM (SRAM), containing a plurality of addressable locations in which data may be stored. Alternatively, the packet buffer 350 may be a predetermined region in the "main" memory 340.

The memory 340 preferably comprises a form of RAM that is generally cleared by a power cycle or other reboot operation (e.g., it is a "volatile" memory). For instance, the memory may comprise dynamic RAM (DRAM) and/or synchronous DRAM (SDRAM) storage locations adapted to store program code and data structures accessible to the processor 320 via the system controller 330. It will be apparent to those skilled in the art that the memory 340 also may comprise other memory means, including various computer-readable media, for storing program instructions and data structures pertaining to the operation of the intermediate network node 200. Further, those skilled in the art will appreciate that at least some portions of the memory 340 may be embodied as electromagnetic signals that are received at the intermediate network node 200 from, e.g., a wireless data link or a data network such as the Internet.

The memory 340 stores, among other things, a router operating system 342, a link-state database 500 (LSDB), a routing information base 700 (RIB), one or more flood queues 800, one or more flood counters 810 and a shortest path first (SPF) trigger value 970. The operating system 342 comprises computer-executable instructions that functionally organize the intermediate node 200 by, e.g., invoking network operations in support of software processes executing on the processor 320. These processes include at least one routing process 344 which is configured to implement a link-state protocol in accordance with the present invention. The process 344 may direct the processor 320 to identify LSPs stored in the packet buffer 350 and copy the LSPs' data into the LSDB 500. Preferably, the LSDB stores only the most current versions of received LSPs.

The routing process 344 also may direct the processor to flood copies of LSPs over the network interfaces 210. In the illustrative embodiment, the flood queues 800 store ordered lists of LSPs to be flooded by the supervisor engine. For instance, the queues 800 may include a "high-priority" queue for storing LSPs that should be flooded as soon as possible and a "normal" queue for storing lower-priority LSPs. The queues may be configured to store LSPs generated within the intermediate network node 200 and/or LSPs received at the node's interfaces 210. If a LSP is generated within the intermediate network node, then the LSP is flooded (i.e., transmitted) over each of the node's interfaces 210. However, if the LSP was received by one of the network interfaces, then the process 344 may instruct the processor 320 to flood the received LSP over every network interface 210 or port 215 except for the one that received the LSP.

The routing process 344 may direct the processor 320 to perform SPF calculations, e.g., using the Dijkstra algorithm, when appropriate. For instance, the SPF calculations may be "triggered" when a received LSP contains new routing information or network topology information, i.e., not already stored in the LSDB 500. Accordingly, the value of the SPF trigger 970, e.g., stored at a predetermined location in the memory 340, may indicate whether a new set of SPF calculations has been triggered. In accordance with the illustrative embodiment, the SPF calculations are ordinarily performed after the received LSP has been flooded or has been scheduled to be flooded. However, when the number of LSPs that have been flooded or scheduled to be flooded during a flooding cycle exceeds a first predetermined threshold value, the routing process instead may instruct the processor to perform SPF calculations before flooding the received LSP.

The results of the SPF calculations may be used to update the contents of the RIB 700. The RIB stores routing information associated with various network nodes in the AS 105. Illustratively, each RIB entry stores, among other things, a network node's MAC and/or IP address and an interface identifier identifying a network interface 210 or port 215 through which the node can be reached. At least one of the flood counters 810 may be used, as described below, to store the number of LSPs that are flooded after the SPF calculations are performed. Illustratively, the process 344 performs RIB updates when the counter exceeds a second predetermined threshold value or there are no more LSPs enqueued, e.g., on the high-priority flood queue. In this way, RIB updates are not delayed indefinitely in favor of flooding operations.

The system controller 330 is coupled to the processor 320, memory 340 and packet buffer 350. The system controller comprises logic and circuitry that enables the processor 320 to access (e.g., read, write) memory locations contained in the packet buffer 350 and the memory 340. The processor 320 is a general-purpose or special-purpose central processing unit (CPU) configured to execute operating-system instructions stored in the memory 340. As noted, the processor 320 executes instructions for, inter alia, flooding received LSPs, performing SPF calculations and updating the contents of the RIB 700.

Advantageously, unlike prior implementations, the processor floods received LSPs before performing other routing computations, such as SPF calculations or RIB updates. As such, LSP flooding operations are not unseasonably delayed while routing-table computations are performed. Because the processor can perform SPF calculations and RIB update computations after multiple LSPs have been flooded, the processor may conserve processing time and bandwidth as compared with conventional implementations.

B. Efficient Link-State Routing

The present invention provides a technique for an intermediate network node 200, such as a router or switch, to efficiently process link-state packets using a single running context (i.e., process or thread). The intermediate network node 200 floods received link-state packets before performing SPF calculations and RIB updates. In addition, the node also limits the number of LSPs that are permitted to be flooded before the node performs its SPF calculations. More specifically, if the number of link-state packets flooded during a flooding cycle exceeds a first predetermined threshold value, then the node stops its flooding operations and begins the SPF calculations. By imposing a limit on the number of flooded packets in this manner, the SPF calculations are not delayed an unreasonable amount of time as a result of excessive packet flooding.

Further, the intermediate network node 200 also limits how long its RIB update may be delayed in favor of flooding operations. After the node performs SPF calculations, if the number of link-state packets that are subsequently flooded exceeds a second predetermined threshold value or there are no more packets to flood, then the intermediate network node 200 updates the contents of its RIB 700 based on the results of the SPF calculations. As such, the intermediate network node ensures that its routing table remains up-to-date, even in the presence of heavy amounts of link-state traffic requiring flooding operations.

By way of example, an illustrative embodiment of the inventive technique will be described with regards to the exemplary autonomous system $AS_2$ illustrated in FIG. 1. Of course, those in the art will understand that the teachings set forth herein are more generally applicable to any arbitrary network configuration without limitation. Accordingly, the scope of the invention is not limited to the specific exemplary arrangement of network nodes depicted in FIG. 1.

As shown, the autonomous system $AS_2$ comprises three intermediate network nodes 200 (A, B and C). The intermediate nodes are coupled to one another by respective point-to-point links 145. The intermediate network node C serves as both an intradomain router within the AS, as well as an interdomain gateway router which can communicate with other autonomous systems via the network 110. The illustrative autonomous system $AS_2$ also includes three client nodes 130 (H1, H2, and H3). The client nodes H1 and H3 are respectively coupled to the intermediate network nodes B and C over point-to-point links 145. In contrast, the client nodes H2 and H3 are coupled to the intermediate node A through the local area network 140.

The intermediate network nodes 200 in $AS_2$ may associate "cost" values with their adjacent (neighboring) network nodes. More specifically, each intermediate network node may associate zero or more cost values with selected neighboring nodes, each cost value indicating the relative ease/burden with which the intermediate node can communicate with that neighbor. The cost values may correspond to the available bandwidth over a physical link coupled to the neighboring node, an amount of time required for a data packet to reach the neighboring node, etc.

For example, in the arrangement shown, the intermediate node A associates cost values with its neighboring nodes B, C, H2 and H3. Namely, a cost value equal to 2 is associated with each of the nodes B and C, whereas the client nodes H2 and H3 are respectively associated with cost values equal to 6 and 5. A plurality of intermediate network nodes may associate different cost values with the same communication link. For example, the intermediate node A associates a cost value equal to 2 with the intermediate node C; however, in the reverse direction, the intermediate node C associates a different cost value, equal to 6, with the intermediate node A.

Changes in the network topology may be communicated among the intermediate network nodes 200 using a link-state protocol, such as the conventional OSPF and IS-IS protocols. Suppose, for example, that a communication link fails within the $AS_2$ or a cost value associated with a network node changes. Once the change in the network's state is detected by one of the intermediate network nodes, that node may flood a LSP communicating the change to the other intermediate nodes in the AS. In this manner, each of the intermediate nodes A-C eventually "converges" to a identical view of the network topology.

Figure 4:
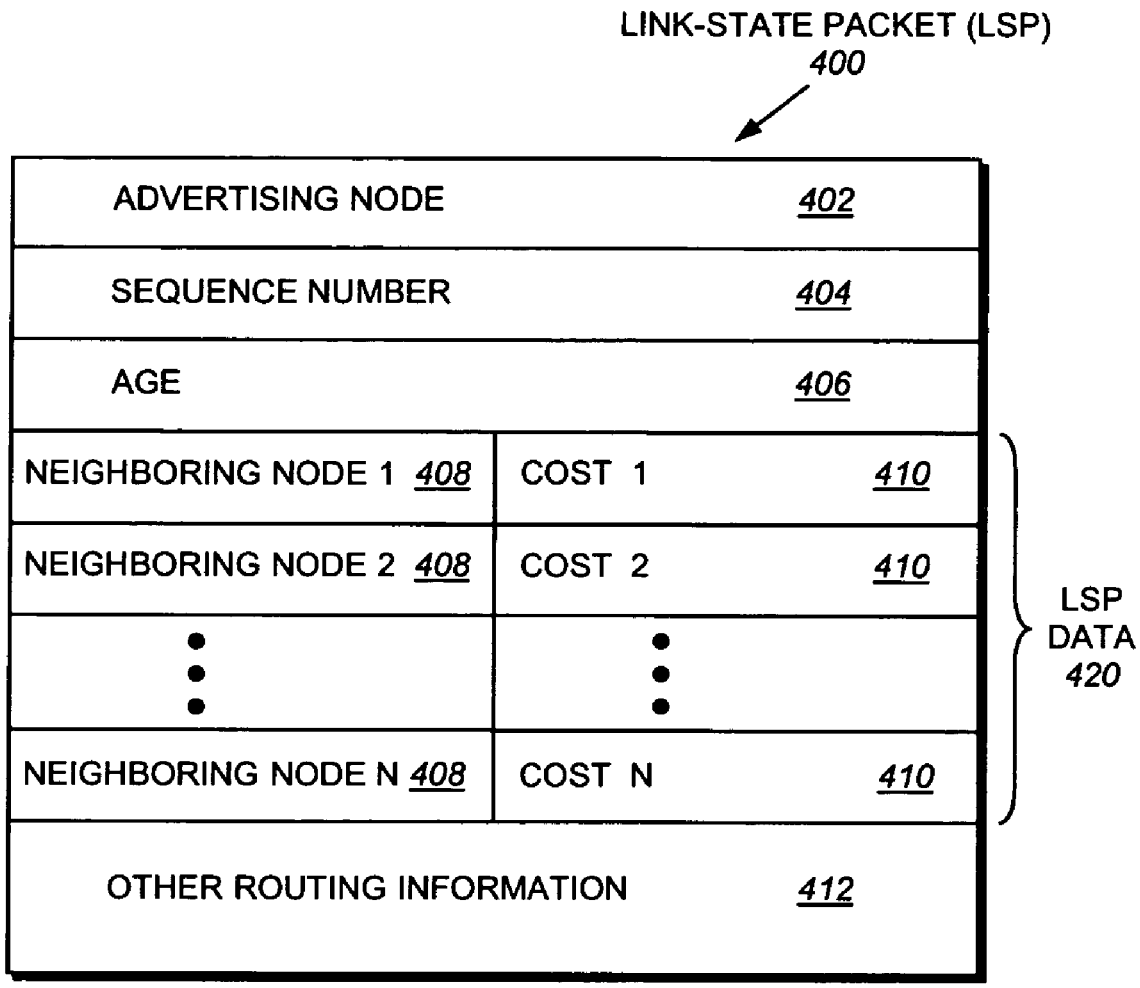
FIG. 4 is a schematic block diagram of an exemplary link-state packet.

FIG. 4 illustrates an exemplary LSP 400 that may be flooded by the intermediate network nodes 200. The packet includes an advertising-node field 402, a sequence-number field 404, an age field 406, a LSP data section 420, and other routing information 412. The advertising-node field 402 stores a value that identifies the intermediate network node that generated and originally broadcast the LSP 400. The sequence-number field 404 stores a sequence number indicating the relative version of the LSP. Typically, the sequence number stored in the field 404 is incremented, e.g., by one, for every new version of the LSP. The LSP 400 is therefore considered "stale" (invalid) if its sequence number is less than the sequence number stored in a previously-received version of the LSP, i.e., generated by the same advertising node. Accordingly, the intermediate network nodes 200 may be configured to store and forward only the most recent version of a LSP, e.g., the version having the largest sequence number.

The age field 406 also stores a value that may be used for determining whether the LSP 400 is valid. The age value is typically initialized to a non-zero integer value, often in units of seconds. The age value may be decremented, e.g., by one every second, until the age value reaches zero, thereby indicating that the LSP has become invalid. That is, every intermediate network node 200 that stores or floods the LSP 400 continuously ages the packet until the age value equals zero. Those skilled in the art will appreciate that other aging mechanisms alternatively may be used, such as incrementing the LSP's age value from an initial value, e.g., equal to zero, until the age value reaches a known upper limit.

The LSP data section 420 includes one or more pairs of neighboring-node fields 408 and cost fields 410. Each neighboring-node field 408 stores a value, such as a MAC or IP address, indicating a network node that is directly accessible from the intermediate node stored in the advertising-node field 402. The field 410 stores a cost value that has been associated, e.g., by the advertising node, with the network node identified in the neighboring-node field 408. As shown, each neighboring-node field 408 is associated with only one corresponding cost field 410. However, it is noted that in other embodiments, a single neighboring node may be associated with a plurality of cost values. Other routing information 412, such as checksum values, packet-length information, flag values, type-of-service metrics, etc., also may be included in the LSP 400.

FIG. 5 illustrates an exemplary LSDB 500 in which the received LSP 400 may be stored in accordance with the present invention. The LSDB comprises a plurality of entries 505, each configured to store the contents of a different LSP. Each LSDB entry may be configured to store a received LSP or a LSP that is generated locally, e.g., by the routing process 344. Each LSDB entry 505 includes, inter alia, an advertising-node field 510, a sequence-number field 520, an age field 530, one or more flag fields 540 and a LSP data field 550. Preferably, the contents of each field 510-550 is initialized, e.g., equal to zero, when the LSDB 500 is allocated in the memory 340.

The advertising-node field 510 stores a value identifying which intermediate node generated (i.e., originally broadcast) the LSP stored in the LSDB entry 505. For instance, the contents of the LSP's advertising-node field 402 may be copied into the advertising-node field 510. The sequence-number field 520 and age field 530 respectively store a sequence number and age value contained in the LSP. Thus, the contents of the LSP's sequence-number field 404 and age field 406 may be copied into the fields 520 and 530. The LSP data field 550 stores routing information, such as pairs of neighboring nodes and cost values, from the LSDB entry's LSP. While the exemplary data fields 550 respectively store $N_1$, $N_2$ and $N_3$ pairs of neighboring nodes and cost values for LSPs advertised by the intermediate network nodes A, B and C, it is also expressly contemplated that one or more of the LSP data fields 550 additionally (or alternatively) may store portions of the LSPs' other routing information 412.

Illustratively, the LSDB entries 505 are organized in the LSDB 500 based on the contents of their advertising-node fields 510. Therefore, in response to receiving a LSP, the value stored in the received LSP's advertising-node field 410 may be used to index a "matching" LSDB entry 505. For example, the advertising node identified in the received LSP may be hashed and the hash result may be used to locate the LSP's matching LSDB entry. If a matching LSDB entry cannot be found, then the received LSP may be stored in an unoccupied or otherwise available entry 505.

Preferably, the received LSP is stored in its matching LSDB entry only if the LSP is determined to be valid, i.e., not stale or "aged" (expired). Specifically, the received LSP's sequence number 404 may be compared with the sequence number stored in the matching entry's sequence-number field 520. If the value of the sequence-number field 520 is greater than the LSP's sequence number, then the received LSP is determined to be stale as compared with a previous version of the LSP stored in the LSDB 500. In this case, the received LSP is not written into the LSDB. Similarly, if the value stored in the LSP's age field indicates that the LSP is no longer valid, e.g., the age value equals zero, then the received LSP is not written into the matching LSDB entry. Notably, once the received LSP has been stored in its matching LSDB entry 505, the routing process 344 may continue to "age" the LSP, e.g., until the value stored in the age field 530 equals zero. Upon completely aging the LSP, the entry 505 may be reused, e.g., to store another LSP.

The flags fields 540 instruct the routing process 344 where to flood LSPs and acknowledgement (ACK) messages. To that end, the flag fields 540 are partitioned into send flags 542 and ACK flags 544. For purposes of illustration, the exemplary LSDB 500 is depicted as it may reside in the intermediate network node C. Accordingly, each LSDB entry 505 includes a send flag 542 and an ACK flag 544 corresponding to the other intermediate nodes A and B in the autonomous system $AS_2$.

The send flags 542 in a LSDB entry 505 indicate to which neighboring intermediate network nodes the entry's LSP should be flooded. Specifically, the LSP is flooded to each neighboring intermediate node whose associated send flag 542 equals a first predetermined value (e.g., "1"). For instance, as shown, the send flags indicate that the intermediate node C is instructed to flood the LSP generated by the advertising intermediate node A to the intermediate node B, and flood the LSP generated by the intermediate node C to both the intermediate nodes A and B. The LSDB's send flags 542 further indicate that the LSP advertised by the intermediate node B does not need to be flooded or has already been flooded to the appropriate neighboring intermediate nodes.

Likewise, an ACK message, which acknowledges receipt of a received LSP, is flooded to neighboring intermediate nodes whose associated ACK flags 544 are set equal to a first predetermined value (e.g., "1"). In the illustrated LSDB 500, the ACK flags indicate that the intermediate node C should forward separate ACK messages to the intermediate nodes A and B. In general, after a LSP is copied into its appropriate LSDB entry 505, the entry's ACK flag 544 corresponding to the intermediate node which sent the LSP is set equal to the first predetermined value, and the send flags 542 corresponding to the remaining intermediate network nodes are also set equal to the first predetermined value.

Figure 6:
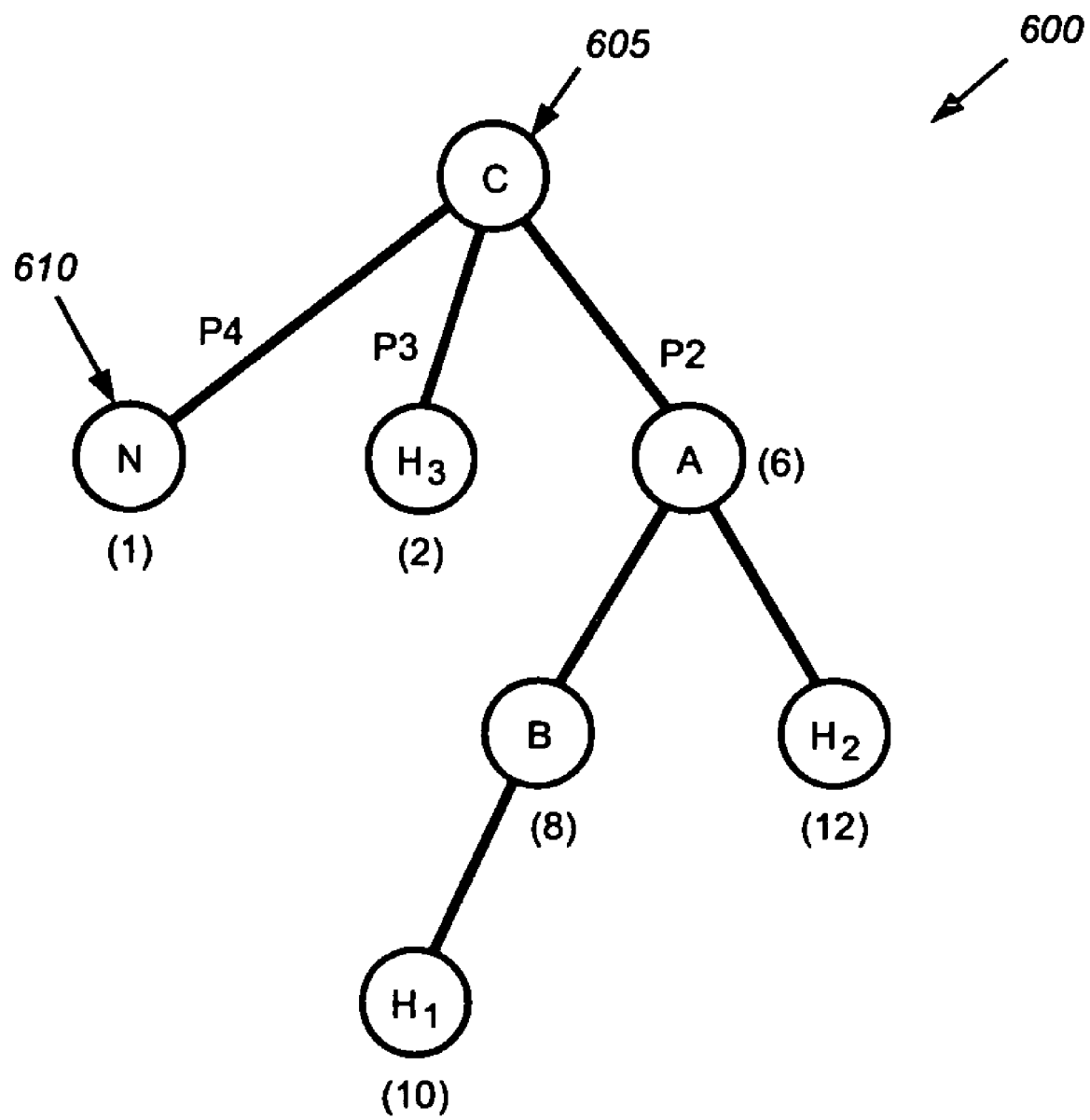
FIG. 6 is a schematic diagram illustrating an exemplary shortest path tree that may be generated as a result of performing shortest path first calculations.

FIG. 6 illustrates a "shortest path tree" 600 that may be generated by SPF calculations performed in the intermediate network node C. Illustratively, the shortest path tree is generated using the Dijkstra algorithm. The tree 600 comprises a root node 605 corresponding to the intermediate network node C and one or more "leaf" nodes 610 that represent network nodes accessible to the intermediate node C. Here, the network (N) 110 is also represented as a leaf node. For each leaf node 610, the tree 600 associates a cost value, as depicted in parentheses, corresponding to the total cost along a network path extending from the intermediate network node C to the network node associated with the leaf node. The Dijkstra algorithm ensures that each leaf node 610 is positioned along a lowest-cost path from the intermediate network node C, i.e., the root node 605. As shown, the shortest path tree 600 also indicates the physical ports 215 (e.g., P2, P3 and P4) that correspond to each network path that "branches" from the root node.

FIG. 7 illustrates an exemplary RIB 700 in which the results of the SPF calculation may be stored. Like the exemplary LSDB 500, the RIB is illustratively shown as it may reside in the intermediate network node C. The RIB 700 comprises a plurality of RIB entries 705, each entry including a destination field 710, a port field 730 and an other routing information field 730. The destination field 710 stores a value that identifies a network node accessible to the intermediate node C. For instance, the destination field 710 may identify a network node whose leaf node 610 is included in the shortest path tree 600. Typically, the identifier stored in the field 710 is a destination IP or MAC address. The port field 720 stores a value identifying a port 215 (or network interface 210) through which communications are routed to the network node identified in the destination field 710. The other routing information field 730 may contain various information related to the network node identified in the field 710. For example, such information stored in the field 730 may include subnet mask lengths, various flag values, protocol-specific data, etc.

Figure 8:
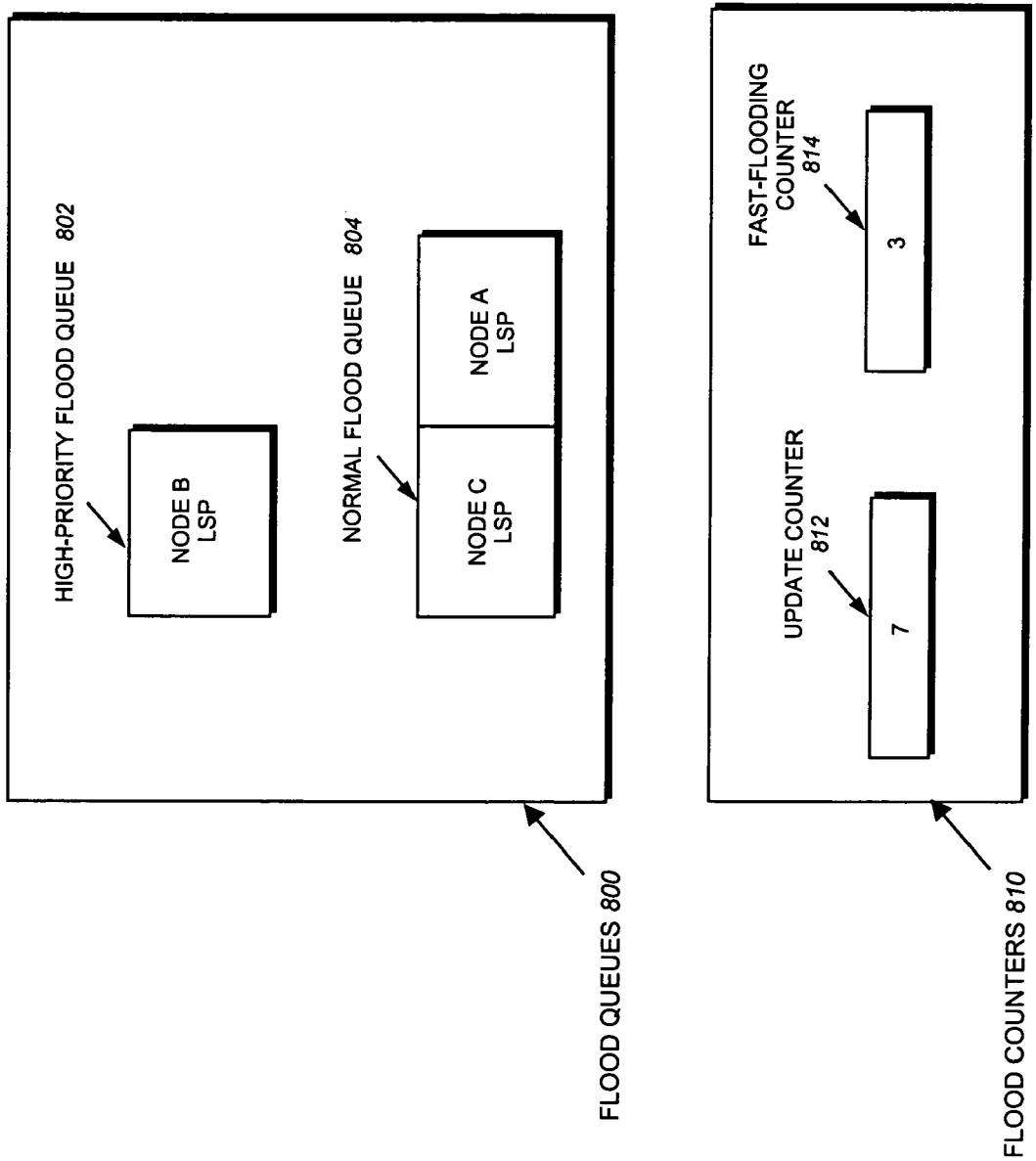
FIG. 8 is a schematic block diagram of exemplary flood queues and flood counters that may be used in accordance with an illustrative embodiment of the present invention.

FIG. 8 illustrates a set of exemplary flood queues 800 and flood counters 810 that may be employed by an intermediate network node 200 in accordance with the illustrative embodiment. Each flood queue stores an ordered list of LSPs waiting to be flooded by the supervisor engine 300. As shown, a high-priority queue 802 stores an ordered list of LSPs that should be flooded as soon as possible. LSPs on the high-priority queue may be designated, e.g., in their routing information 412, as being high-priority packets. Alternatively, the routing process 344 may associate a high-priority status with a LSP based on a predetermined set of criteria used to identify high-priority packets. For instance, the criteria may identify a high-priority LSP when the LSP's data contents 420 trigger a new set of SPF calculations. Other, lower-priority LSPs are enqueued on the normal flood queue 804.

In practice, when a LSP is received by the intermediate network node 200, the routing process 344 stores the received LSP in an appropriate LSDB entry 505 before enqueueing the LSP on an appropriate one of the flood queues 802 and 804. Advantageously, only the most-current version of a LSP, i.e., the version having the largest sequence number, is stored in the LSDB and enqueued on the flood queue. In other words, the supervisor engine 300 only floods the most-current version of a received LSP, even if an older version of the LSP was previously received but not yet flooded. The LSPs enqueued on the flood queues may be bodily incorporated into the queues 800, or alternatively the queues may comprise ordered lists of pointers whose values reference the memory locations, e.g., in the packet buffer 350, of their enqueued LSPs.

In accordance with the illustrative embodiment, the routing process 344 dequeues LSPs from the "head" of the flood queues and floods the dequeued LSPs before routing computations, such as SPF and RIB calculations, are performed. Preferably, LSPs are dequeued and flooded from the high-priority queue 802 before LSPs on the normal queue 804 are processed. After dequeueing and flooding a LSP, the routing process 344 toggles the values of the LSP's send flags 542, e.g., from a first predetermined value (e.g., "1") to a second predetermined value (e.g., "0"), to indicate that the LSP no longer needs to be flooded.

The routing process 344 increments the value of an "update" counter 812 each time it enqueues a LSP on the flood queues 800. The value of the update counter is initialized to a predetermined value, preferably equal to zero, at the beginning of each flooding cycle. The update counter 812 is incremented, e.g., by one, every time a LSP is flooded immediately or is scheduled to be flooded at a later time, regardless of the LSP's associated priority level. Notably, if the routing process floods a plurality of packets at once, the value of the update counter 812 may be incremented by the number of packets flooded. When the value of the update counter exceeds a first predetermined threshold value, the routing process 344 instructs the processor 320 to perform SPF calculations, assuming SPF calculations have been triggered, before additional LSPs may be flooded.

Figure 9:
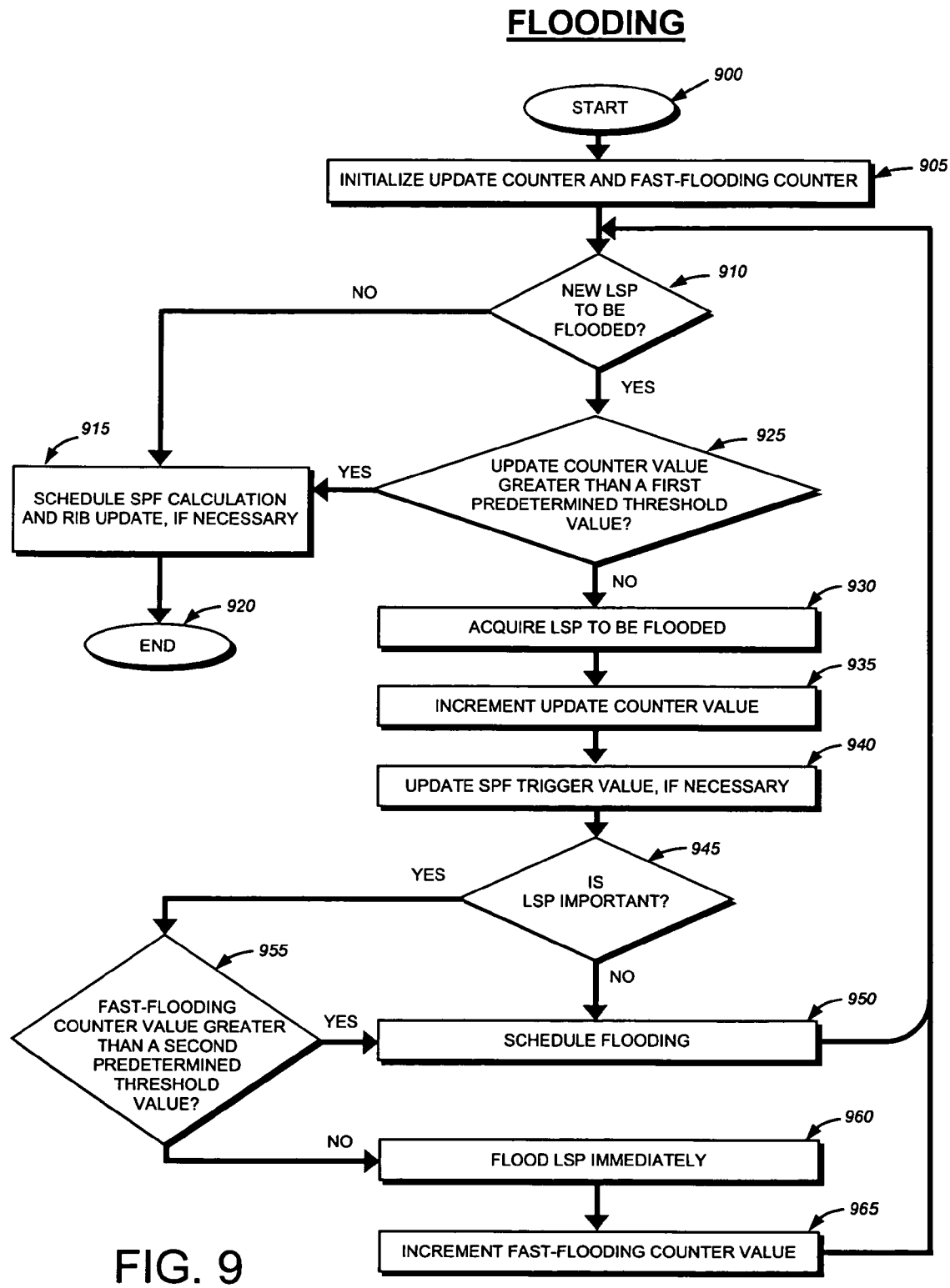
FIG. 9 is a flowchart illustrating a sequence of steps for flooding link-state packets at an intermediate network node in accordance with the illustrative embodiment.
Figure 10:
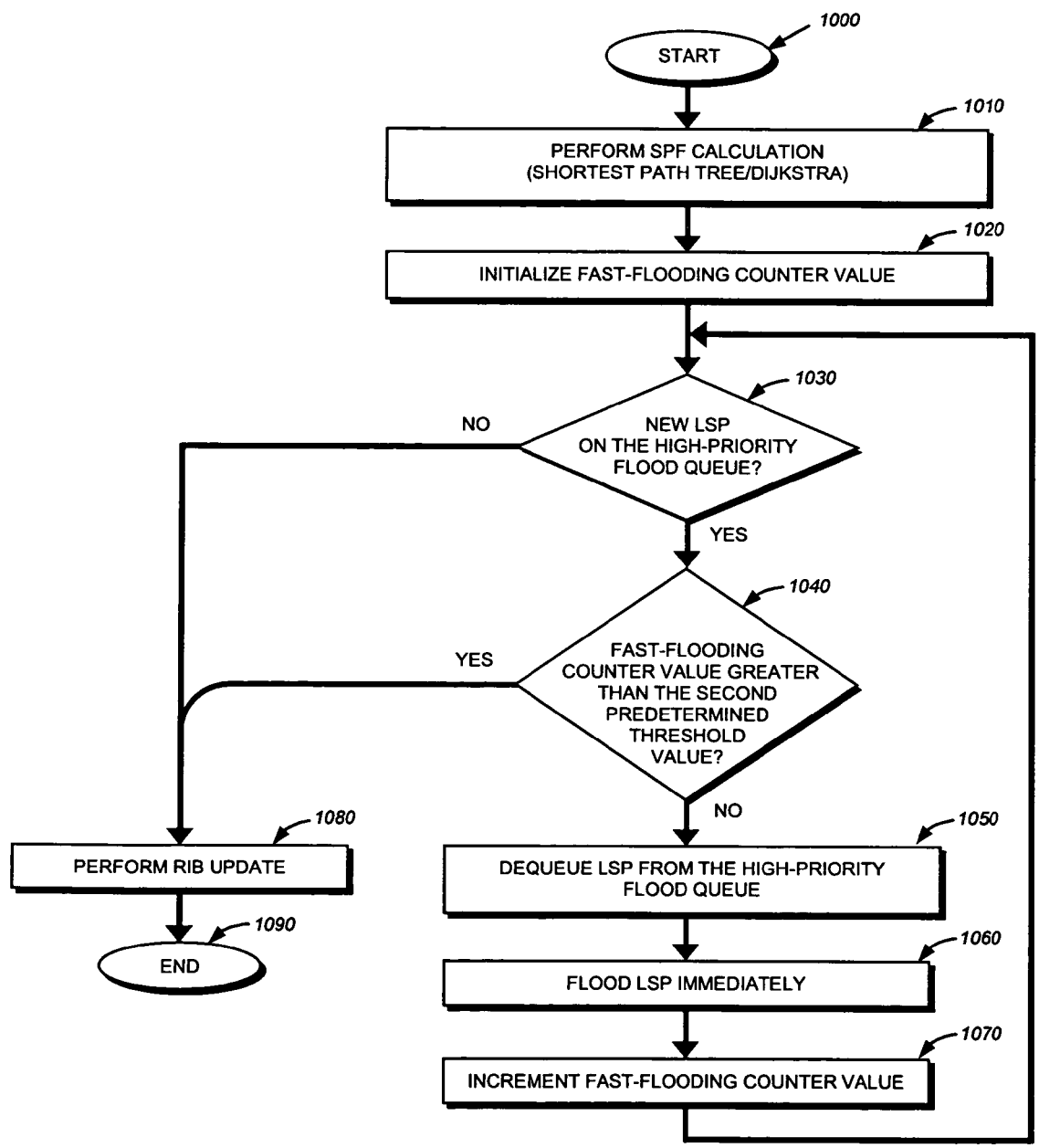
FIG. 10 is a flowchart illustrating a sequence of steps for performing shortest path first calculations and routing information base updates in accordance with the illustrative embodiment.

A "fast-flooding" counter 814 records the number of LSPs that have been flooded immediately, i.e., from the high-priority queue 802, during either a flooding cycle (FIG. 9) or a SPF calculation/RIB update cycle (FIG. 10). The counter 814 is preferably initialized equal to zero at the beginning of each cycle. After flooding a LSP from the high-priority queue, the routing process 344 increments the value of the fast-flooding counter 814, e.g., by one. Advantageously, RIB updates are performed during a SPF calculation/RIB update cycle when the value of the fast-flooding counter 814 becomes greater than a second predetermined threshold value or there are no more high-priority LSPs to be flooded. As such, a plurality of LSPs may be flooded before the RIB is updated, without indefinitely delaying the RIB update in favor of flooding operations.

FIG. 9 is a flowchart illustrating a sequence of steps for performing flooding operations during a flooding cycle at the intermediate network node 200. The sequence starts at step 900 and proceeds to step 905 where the values of the update counter 812 and the fast-flooding counter 814 are initialized, e.g., equal to zero. Next, at step 910, it is determined whether there is at least one new LSP to be flooded. For instance, the intermediate network node may maintain a queue (not shown), e.g., in its memory 340, which stores LSPs to be processed during the flooding cycle. Alternatively, the node may be notified when a new LSP has been added to its LSDB 500. Those skilled in the art will understand that the node may employ various techniques for determining whether there is at least one new LSP, e.g., received at its network interfaces 210 or generated locally, to be flooded.

The sequence advances to step 915 if it is determined that there is not a new LSP to be flooded. At step 915, the intermediate network node schedules a new set of SPF calculations and RIB updates, if necessary. Illustratively, the SPF trigger value 970 indicates whether a new set of SPF calculations is necessary. For instance, the SPF trigger may equal a first value (e.g., "1") if SPF calculations should be scheduled, and may equal a second value (e.g., "0") otherwise. The sequence ends at step 920.

If, at step 910, it is determined that a new LSP is to be flooded, then, at step 925, the intermediate network node determines whether the value of the update counter 812 is greater than a first predetermined threshold value. If it is, the sequence proceeds to step 915 as described above. However, if the value of the update counter is less than or equal to the first predetermined threshold value, then, at step 930, the new LSP is acquired, e.g., from an appropriate location in the packet buffer 350. At step 930, the value of the update counter 812 is incremented, e.g., by one.

At step 940, the contents of the acquired LSP is analyzed to determine whether the LSP triggers new SPF calculations. The LSP may trigger SPF calculations if its data section 420 contains a change in the network topology (or other routing information) as compared with a previously-received version of the LSP, i.e., stored in the LSDB 500. For example, the data section 420 may indicate a change in cost value(s) associated with a network node or a change in accessible network nodes in the AS, etc. If the LSP triggers a new set of SPF calculations, the value of the SPF trigger 970 may be modified, if it has not been already, to a value indicating that SPF calculations have been triggered.

At step 945, the LSP is analyzed to determine whether it is "important." In this context, a LSP is important if should be flooded as soon as possible, i.e., the LSP is associated with a high priority. The priority level of the LSP may be determined from the contents of the LSP or may be otherwise determined by the intermediate network node 200 using a predetermined set of criteria. When the LSP is not determined to be important, the sequence advances to step 950 and the LSP is enqueued on the normal flood queue 804 and thus scheduled for flooding. Then, the sequence returns to step 910.

In contrast, if the LSP is deemed to be important, then, at step 955, the value of the fast-flooding counter 814 is compared with a second predetermined threshold value. If the fast-flooding counter value is greater than the second predetermined threshold value, the sequence proceeds to step 950 where the LSP is enqueued on the normal flood queue 804 and scheduled for flooding; the sequence then returns to step 910. Otherwise, at step 960, the LSP is enqueued on the high-priority flood queue 802 so it may be flooded immediately. At step 965, the value of the fast-flooding counter is incremented, e.g., by one. The sequence returns to step 910.

FIG. 10 is a flowchart illustrating a sequence of steps for performing SPF calculations and RIB updates in accordance with the present invention. The sequence starts at step 1000 and proceeds to step 1010 where a set of SPF calculations is performed, e.g., using the Dijkstra algorithm. After performing the SPF calculations, the value of the SPF trigger 970 may be reset to indicate that SPF calculations are no longer triggered. At step 1020, the value of the fast-flooding counter 814 is initialized, e.g., equal to zero. Next, at step 1030, it is determined whether a new LSP has been enqueued on the high-priority queue 802. If not, the sequence proceeds to step 1080 where a RIB update is performed. The sequence ends at step 1090.

However, if a new LSP is enqueued on the high priority flood queue, then, at step 1040, the value of the fast-flooding counter 814 is compared with a predetermined threshold value, preferably equal to the second predetermined threshold value described at step 955 of FIG. 9. When the value of the fast-flooding counter is greater than the second predetermined threshold value, a RIB update is performed at step 1080 and the sequence ends at step 1090. On the other hand, if the value of the fast-flooding counter value is less than or equal to the second predetermined threshold value, then, at step 1050, a LSP is dequeued from the high-priority flood queue 802. At step 1060, the dequeued LSP is flooded immediately. At step 1070, the value of the fast-flooding counter is incremented, e.g., by one, and the sequence returns to step 1030.

C. Conclusion

The foregoing has been a detailed description of illustrative embodiments of the invention. Various modifications and additions can be made without departing from the spirit and scope of the invention. For example, the present invention generally may be employed using various network protocols in which a single running context concurrently performs routing calculations and flooding operations, and thus the invention is not limited to the exemplary link-state protocols, such as the OSPF and IS-IS protocols, described herein. Further, while LSPs are illustrated as being enqueued on the flood queues 800, those skilled in the art will appreciate that the flood queues also may include ACK messages to be flooded.

Although the routing process 344 in the illustrative embodiment resides in the memory 340, it is expressly contemplated that the routing process, or portions thereof, may reside on a network interface 210, such as a line card. Furthermore, execution of the routing process may be distributed among a plurality of processors, some of which may be located, e.g., on the network interfaces 210 and/or in the supervisor engine 300. Also, those skilled in the art will appreciate that the routing process 344 may be directly incorporated or linked into the operating system 342, or alternatively the routing process may be a user-level process that executes in conjunction with the operating system.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for an intermediate network node to efficiently process and disseminate link-state packets (LSP), the method comprising:
   receiving a LSP at the intermediate network node;
   in response to receipt of the received LSP, determining whether a number of LSPs that have been flooded before shortest path first (SPF) calculations are performed exceeds a predetermined threshold value;
   if the number of LSPs that have been flooded before shortest path first (SPF) calculations are performed exceeds the predetermined threshold value, performing SPF calculations before flooding the received LSP from the intermediate node to at least another network node; and
   if the number of LSPs that have been flooded before shortest path first (SPF) calculations are performed is less than the predetermined threshold value, flooding the received LSP from the intermediate node to at least another network node, and performing, after flooding the received LSP, shortest path first (SPF) calculations based on the contents of the received LSP.

2. The method of claim 1, further comprising:
   updating, after performing the SPF calculations, a routing information base (RIB) based on the results of the SPF calculations.

3. The method of claim 2, further comprising:
   determining, before updating the RIB, whether a number of LSPs flooded after the SPF calculations is greater than a second predetermined threshold value; and
   flooding, before updating the RIB, at least one newly received LSP if it is determined that the number of LSPs flooded after the SPF calculations is not greater than the second predetermined threshold value.

4. The method of claim 3, further comprising:
   flooding, before updating the RIB, at least one newly received high-priority LSP if it is determined that the number of LSPs flooded after the SPF calculations is not greater than the second predetermined threshold value.

5. The method of claim 3, wherein a counter stores the number of LSPs flooded after the SPF calculations are performed.

6. The method of claim 1, wherein the number of LSPs that have been flooded is determined based on the value of a counter.

7. The method of claim 1, further comprising:
   determining, before flooding the received LSP, whether the received LSP is a valid link-state packet; and
   performing the steps of flooding the received LSP and performing SPF calculations after it is determined that the received LSP is a valid link-state packet.

8. The method of claim 7, wherein the received LSP is determined to be a valid link-state packet if a sequence number stored in the received LSP is greater than a sequence number stored in a previously received version of the received LSP.

9. The method of claim 7, wherein the received LSP is determined to be a valid link-state packet if an age value stored in the received LSP indicates that the received LSP has not expired.

10. The method of claim 1, wherein the SPF calculations are performed using the Dijkstra algorithm.

11. The method of claim 1, wherein the received LSP is formatted in accordance with one of the OSPF and IS-IS link-state protocols.

12. The method of claim 1, wherein the method is performed by a single running context executing in the intermediate network node.

13. An apparatus that efficiently processes and disseminates link-state packets (LSP), the apparatus comprising:
    means for receiving a LSP;
    means for, in response to receipt of the received LSP, determining whether a number of LSPs that have been flooded before shortest path first (SPF) calculations are performed exceeds a predetermined threshold value;
    means for performing SPF calculations before flooding the received LSP from the intermediate node to at least another network node, if the number of LSPs that have been flooded before shortest path first (SPF) calculations are performed exceeds the predetermined threshold value; and
    means for flooding the received LSP from the intermediate node to at least another network node, and performing, after flooding the received LSP, shortest path first (SPF) calculations based on the contents of the received LSP, if the number of LSPs that have been flooded before shortest path first (SPF) calculations are performed is less than the predetermined threshold value.

14. The apparatus of claim 13, further comprising:
    means for updating, after performing the SPF calculations, a routing information base (RIB) based on the results of the SPF calculations.

15. The apparatus of claim 14, further comprising:
    means for determining, before updating the RIB, whether a number of LSPs flooded after the SPF calculations is greater than a second predetermined threshold value; and
    means for flooding, before updating the RIB, at least one newly received LSP if it is determined that the number of LSPs flooded after the SPF calculations is not greater than the second predetermined threshold value.

16. The apparatus of claim 13, further comprising:
    means for determining, before flooding the received LSP, whether the received LSP is a valid link-state packet; and
    means for performing the steps of flooding the received LSP and performing SPF calculations after it is determined that the received LSP is a valid link-state packet.

17. An intermediate network node for efficiently processing and disseminating link-state packets (LSP), the intermediate network node comprising:
    a processor;
    a network interface adapted to receive a LSP;

a memory configured to store instructions executable by the processor for performing the steps of:

in response to receipt of the received LSP, determining whether a number of LSPs that have been flooded before shortest path first (SPF) calculations are performed exceeds a predetermined threshold value;

if the number of LSPs that have been flooded before shortest path first (SPF) calculations are performed exceeds the predetermined threshold value, performing SPF calculations before flooding the received LSP from the intermediate node to at least another network node; and if the number of LSPs that have been flooded before shortest path first (SPF) calculations are performed is less than the predetermined threshold value, flooding the received LSP from the intermediate node to at least another network node, and performing, after flooding the received LSP, shortest path first (SPF) calculations based on the contents of the received LSP.

18. The intermediate network node of claim 17, wherein the memory is further configured to store instructions for performing the steps of:

updating, after performing the SPF calculations, a routing information base (RIB) based on the results of the SPF calculations.

19. The intermediate network node of claim 18, wherein the memory is further configured to store instructions for performing the steps of:

determining, before updating the RIB, whether a number of LSPs flooded after the SPF calculations is greater than a second predetermined threshold value; and flooding, before updating the RIB, at least one newly received LSP if it is determined that the number of LSPs flooded after the SPF calculations is not greater than the second predetermined threshold value.

20. The intermediate network node of claim 17, wherein the memory is further configured to store instructions for performing the steps of:

determining, before flooding the received LSP, whether the received LSP is a valid link-state packet; and performing the steps of flooding the received LSP and performing SPF calculations after it is determined that the received LSP is a valid link-state packet.

21. A computer-readable medium encoded with instructions for execution by a processor, the instructions for a method of efficiently processing and disseminating link-state packets (LSP) at an intermediate network node, the method comprising:

receiving a LSP at the intermediate network node;

in response to receipt of the received LSP, determining whether a number of LSPs that have been flooded before shortest path first (SPF) calculations are performed exceeds a predetermined threshold value;

if the number of LSPs that have been flooded before shortest path first (SPF) calculations are performed exceeds the predetermined threshold value, performing SPF calculations before flooding the received LSP from the intermediate node to at least another network node; and if the number of LSPs that have been flooded before shortest path first (SPF) calculations are performed is less than the predetermined threshold value, flooding the received LSP from the intermediate node to at least another network node, and performing, after flooding the received LSP, shortest path first (SPF) calculations based on the contents of the received LSP.

22. The computer-readable medium of claim 21, wherein the method further comprises the step of:

updating, after performing the SPF calculations, a routing information base (RIB) based on the results of the SPF calculations.

23. A method for an intermediate network node to efficiently process and disseminate link-state packets (LSP), the method comprising:

generating a LSP at the intermediate network node;

in response to the generated LSP, determining whether a number of LSPs that have been flooded before shortest path first (SPF) calculations are performed exceeds a predetermined threshold value;

if the number of LSPs that have been flooded before shortest path first (SPF) calculations are performed exceeds the predetermined threshold value, performing SPF calculations before flooding the generated LSP from the intermediate node to at least another network node; and if the number of LSPs that have been flooded before shortest path first (SPF) calculations are performed is less than the predetermined threshold value, flooding the generated LSP from the intermediate node to at least another network node, and performing, after flooding the received LSP, shortest path first (SPF) calculations based on the contents of the generated LSP.

24. The method of claim 23, further comprising:

updating, after performing the SPF calculations, a routing information base (RIB) based on the results of the SPF calculations.

* * * * *

UNITED STATES PATENT AND TRADEMARK OFFICE
CERTIFICATE OF CORRECTION

PATENT NO.      : 7,558,214 B2                           Page 1 of 1
APPLICATION NO. : 10/928866
DATED           : July 7, 2009
INVENTOR(S)     : Stefano B. Previdi It is certified that error appears in the above-identified patent and that said Letters Patent is hereby corrected as shown below:

Col. 1, Line 60, please amend as shown:

[[is ]]interface is often associated with a hardware-specific

Signed and Sealed this

Twelfth Day of October, 2010

David J. Kappos
*Director of the United States Patent and Trademark Office*